Jan. 26, 1965 H. W. HOEPTNER 3,166,898
LIQUID INJECTION SYSTEM
Filed Jan. 16, 1962 2 Sheets-Sheet 1

INVENTOR.
HERBERT W. HOEPTNER
BY
Eckhoff & Slick
ATTORNEYS

INVENTOR.
HERBERT W. HOEPTNER
BY
Eckhoff & Slick
ATTORNEYS

United States Patent Office 3,166,898
Patented Jan. 26, 1965

3,166,898
LIQUID INJECTION SYSTEM
Herbert W. Hoeptner, San Jose, Calif., assignor to United Aircraft Corporation, a corporation of Delaware
Filed Jan. 16, 1962, Ser. No. 166,642
2 Claims. (Cl. 60—35.6)

This invention relates to a peripheral liquid injection system for a hybrid rocket motor.

With the advent of the hybrid rocket motor wherein liquid and solid propellants are combined, new design paarameters are required. In conventional solid propellant engines, the burning surface is largely controlled by the geometry of the engine, while in a hybrid engine the burning surface is dependent not only upon the configuration of the solid component but also its orientation with respect to the injection of the liquid propellant.

In accordance with the present invention, a design is provided which provides a large solid propellant burning surface area and proper liquid propellant distribution for efficient combustion in a hybrid rocket motor.

Further, the present invention provides an ideal system for use with segmented hybrid motors and is particularly adapted to such motors.

Additionally, the present invention provides a system for the regenerative cooling of the joints of hydrid segmented motors so that the joints can be simpler and lighter than conventional uncooled joints.

The present invention provides a large area of burning so that relatively slow-burning grains can be used.

In hybrid engines heretofore used, with the injector located either at the front end or with a piccolo injector located at the center of the burning port, the propellant grain burns away from the injector rapidly, while with the present invention an injection system is provided wherein the propellant grain does not burn away from the injector as rapidly. Further, the distance that the liquid propellant has to travel is far less than any conventional injection system.

A further advantage of the present invention is that it increases turbulence of the combustion gases, which tends to prevent the loss of unreacted liquid propellant through the nozzle.

In the drawings forming part of this application:

Figure 1:
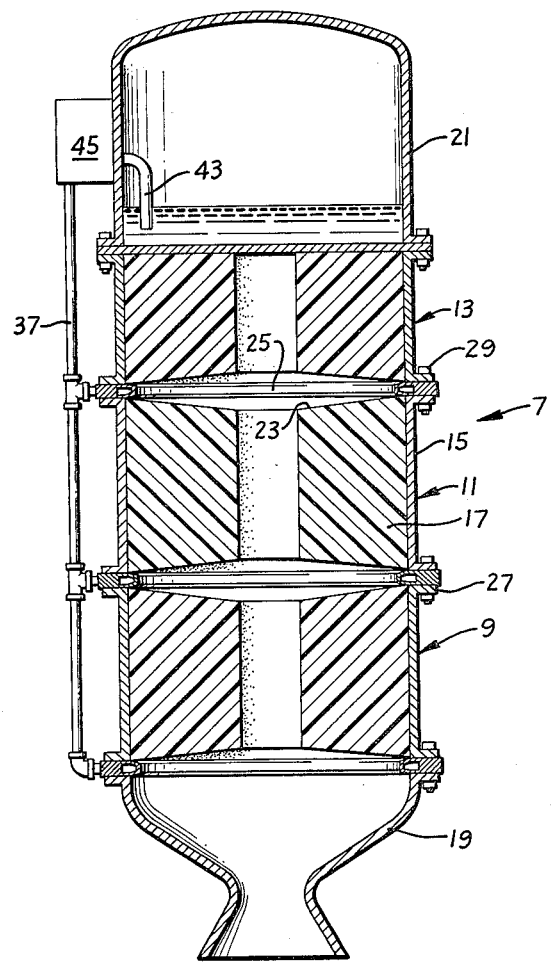
FIGURE 1 is a sectional view of a segmented rocket engine embodying the present invention.
Figure 2:
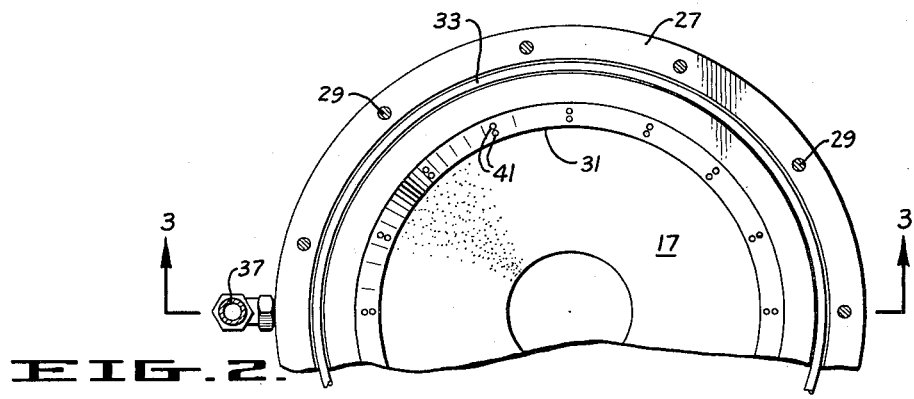
FIGURE 2 is an enlarged plan view of the rocket engine of FIGURE 1 on the lines 2—2 of FIGURE 3.
Figure 3:
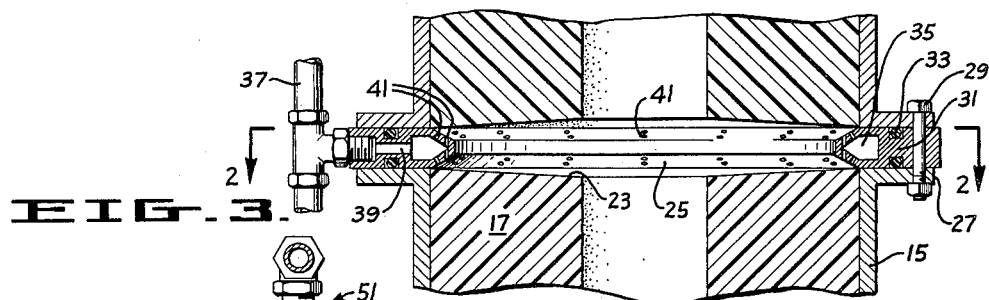
FIGURE 3 is a sectional view on the lines 3—3 of FIGURE 2.

Referring now to the drawings by reference characters, there is shown in FIGURES 1 through 3 a segmented rocket engine generally designated 7 comprising segments 9, 11 and 13, each of which has a casing 15 with a propellant grain 17 therein. A nozzle 19 is provided at the aft end of the engine and a tank 21 at the forward end of the engine. In the description which follows, it is assumed that a solid fuel is used with a liquid oxidizer, but the reverse could be true. The ends of the porpellant grains are not in contact with each other but are tapered as at 23, leaving an open space 25 between grain segments. Each of the casing segments has a flange 27 so that it may be bolted by means of the bolt 29 to a mating segment. However, this is shown only for purposes of illustration and other methods of joint structure may be employed. In accordance with the present invention, a ring 31 provided with sealing O-rings 33 is placed between each of the mating segments. The ring 31 has an annular cavity 35 which constitutes a manifold for conveying an oxidizer from the line 37 through the opening 39 to the manifold 35, discharging into a plurality of spaced injection ports 41 located at suitable intervals around the ring 31. In this manner, liquid oxidizer is sprayed from a number of ports between each two grain segments, insuring good distribution of the oxidizer throughout the rocket motor. Further, the reservoir or manifold of liquid 35 serves both to protect the joint from undue heating and to provide preheating of the liquid. Thus, there is a saving in weight over conventional joints which must be well-insulated. Further, the preheating of the oxidizer increases the efficiency of the motor. The oxidizer is contained within the tank 21 and is conveyed by line 43 through a control mechanism 45 into the line 37.

Figure 4:
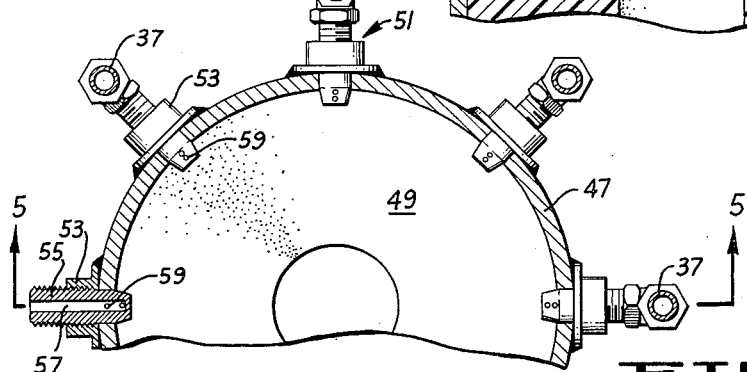
FIGURE 4 is an enlarged partial plan view of a rocket engine having a solid casing embodying the present invention.
Figure 5:
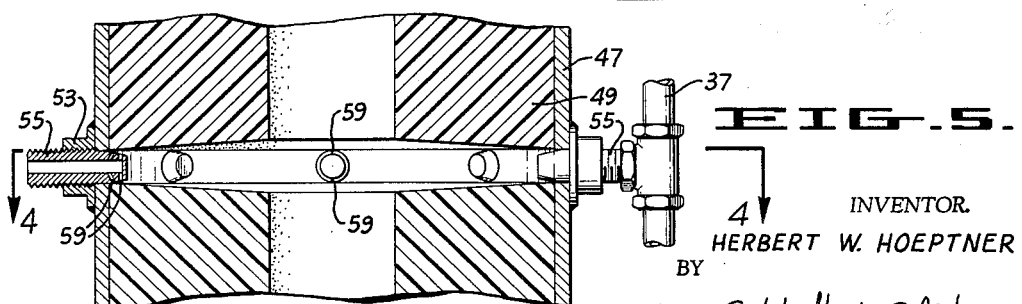
FIGURE 5 is a sectional view on the lines 5—5 of FIGURE 4.

In FIGURES 4 and 5 another embodiment of the invention is shown in connection with a rocket engine which is not segmented. With this configuration, the segmented grain would ordinarily be cast and placed in the casing using a spacer between each segment of the grain. In accordance with this embodiment of the invention, the casing of a non-segmented engine 47 having a segmented grain 49 is provided with a plurality of holes and an injection head 51 is provided in each of the holes. In the embodiment illustrated, this is accomplished by installing a threaded bushing 53 opposite each of the holes and screwing the injector therein. The injector comprises a threaded body portion 55 having a central hole 57 which leads to the injection parts 59. The treaded member 55 is connected to a supply line 37 as previously described. A separate supply line 37 can be used for each row of injectors, as shown, or a manifold might be provided connecting all of the injectors on each level to a common supply line.

It is believed apparent from the foregoing that I have provided a novel injector system for a hybrid rocket motor which has a number of advantages over injector systems heretofore employed.

I claim:

1. A hybrid rocket motor having a liquid propellant and a solid propellant wherein said solid propellant is in the form of transverse segments within a casing with a space between adjacent segments, and a plurality of injectors located in the space between adjacent, solid segments and directed against the respective ends of the adjacent, soild segments whereby a liquid propellant can be injected between the grain segments.

2. A hybrid rocket engine comprising a plurality of transverse casing and grain segments whereby a space is left between adjacent grain segments, and an annular manifold located between adjacent segments of the casing, said annular manifold having a plurality of injection nozzles therein directed against the respective ends of the adjacent segments whereby a liquid propellant can be injected between the segment grains, serving to supply liquid propellant through the solid propellant grain and to cool the casing joint.

References Cited by the Examiner

UNITED STATES PATENTS

| | | | |
|---|---|---|---|
| 2,434,652 | 1/48 | Hickman | 60—35.6 |
| 2,984,973 | 5/61 | Stegelman | 60—35.6 |
| 2,987,875 | 6/61 | Fox | 60—35.6 |
| 2,990,682 | 7/61 | Mullaney | 60—35.6 |
| 3,017,748 | 1/62 | Burnside | 60—35.6 |
| 3,068,641 | 12/62 | Fox | 60—35.6 |

OTHER REFERENCES

Hydrib Propulsion Systems, by Douglas D. Ordahl, published in Astronautics, by the American Rocket Society, October 1959; pages 42, 43 and 84.

SAMUEL LEVINE, *Primary Examiner.*

SAMUEL FEINBERG, *Examiner.*